United States Patent
Clayton

[11] 3,892,417
[45] July 1, 1975

[54] GASKET FOR SEALING A CASKET

[75] Inventor: Marvin Courtland Clayton, Springfield, Mo.

[73] Assignee: American Funeral Supply Corporation, Springfield, Mo.

[22] Filed: Aug. 27, 1973

[21] Appl. No.: 391,936

[52] U.S. Cl. .................... 277/207 R; 27/2
[51] Int. Cl. ............................. F16j 15/00
[58] Field of Search ...... 277/207, 208, 211; 49/495, 49/485, 475; 27/17, 7, 2; 220/46 R; 52/403, 396; 161/DIG. 3

[56] References Cited
UNITED STATES PATENTS

| | | | |
|---|---|---|---|
| 2,322,867 | 6/1943 | Meyer | 277/207 |
| 2,589,332 | 3/1952 | Brown | 277/208 |
| 3,065,517 | 11/1962 | Dower | 277/207 |

Primary Examiner—Richard E. Aegerter
Assistant Examiner—L. Footland
Attorney, Agent, or Firm—Lockwood, Dewey, Zickert & Alex

[57] ABSTRACT

Gaskets for sealing the seal areas formed at the rim of the shell portion of a burial casket and the seal area between the cover sections take the form of a strip of flexible resilient rubber-like material which in addition to the usual ribs integrally formed and extending along the inner and outer edges has on one sealing surface an embossed pattern in the form of a series or chain of diamonds joined point-to-point. In a preferred embodiment separate ribs run along the inner margin or edge of a gasket one of which extends above the main body portion of the gasket and the other extending below.

4 Claims, 5 Drawing Figures

GASKET FOR SEALING A CASKET

This invention relates, generally, to innovations and improvements in gaskets for sealing burial caskets to prevent ingress and egress of air and moisture. More specifically, the invention relates to providing such sealing gaskets embossed with a special pattern in the form of a series or chain of diamonds interconnected point to point. It has been found that such a pattern or configuration of embossed diamonds substantially enhances the sealing characteristics of the gasket.

Accordingly, the object of the invention, generally stated, is the provision of sealing gaskets of the type described for burial caskets having improved sealing characteristics while retaining the advantages and characteristics of conventional or known casket gaskets.

A more specific object of the invention is to take advantage of the improved sealing characteristics provided by embossing on a seal surface of a gasket in strip form of a series or chain of interconnected diamonds touching point to point.

Certain other objects of the invention will be apparent from the following description of a preferred embodiment of the invention taken in connection with the accompanying drawings wherein.

Figure 1:
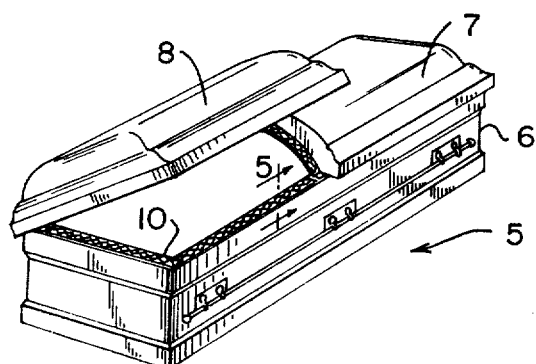
FIG. 1 is a perspective view of a conventional burial casket having a shell gasket and a sealer channel gasket made in accordance with the present invention.

Referring to FIG. 1 of the drawings, a burial casket of conventional construction is indicated generally at 5 comprising a foot section 7 shown in the closed position and a head section or head cap 8 shown partially lifted. The present invention is concerned with the gaskets for sealing the casket 5 including the rectangular shell gasket 10 which fits on the rim of the shell portion 6 and provides a seal between the cover or lid portions 7 and 8 and the shell 6, and the sealer channel gasket 11 (FIG. 5) which seals the mating arched seal areas between the foot and head sections 7 and 8 and with the shell gasket 10 in known manner.

It is to be understood that the casket 6 is intended to be representative of caskets that are commonly available and that the invention pertains to certain special features of the shell gasket 10 as well as the sealer channel gasket 11 when the casket has a two-part cover or lid. It will be understood that if the cover or lid of the casket is in one piece, there will be no requirement for the sealer channel gasket 11.

Figure 4:
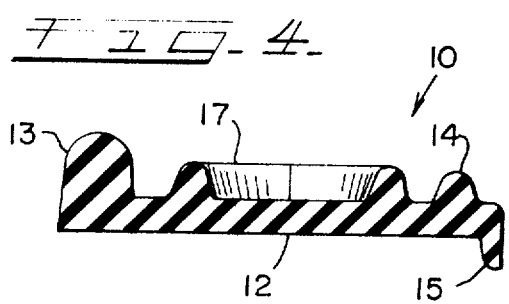
FIG. 4 is a sectional view taken on line 4—4 of FIG. 3.
Figure 2:
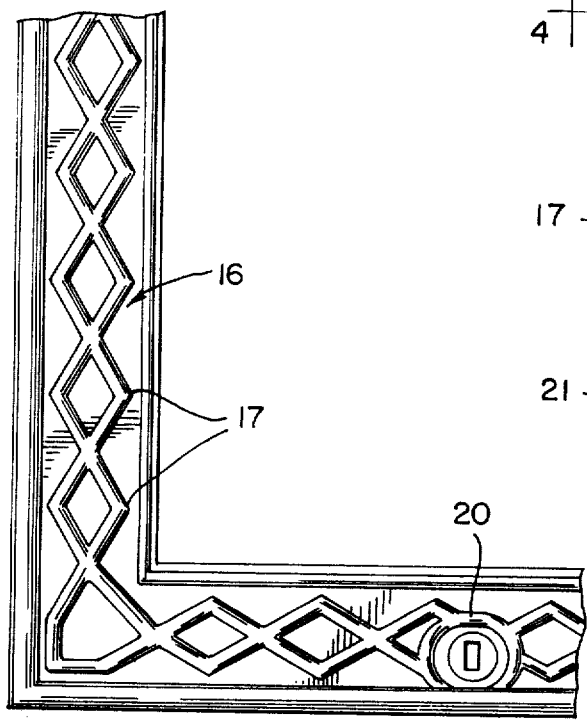
FIG. 2 is a fragmentary top plan view on enlarged scale of a corner of the rectangular shell gasket incorporated in the casket shown in FIG. 1 and mounted on the rim of the shell portion of the casket.
Figure 3:
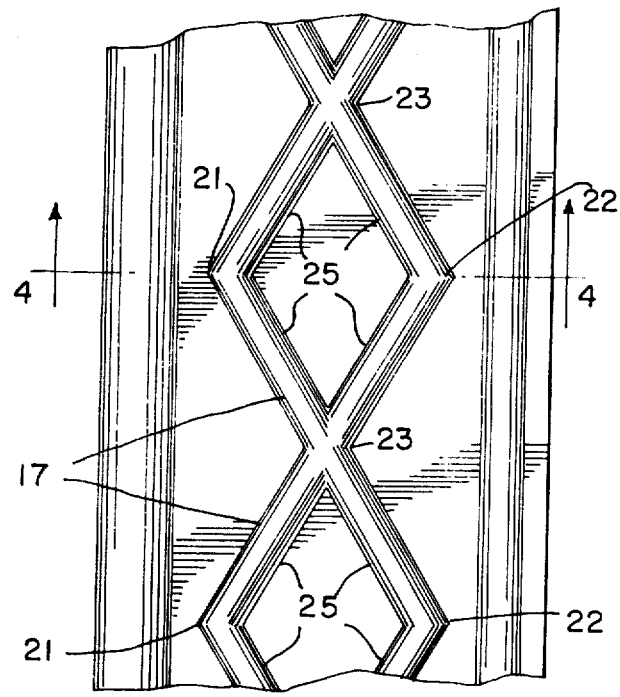
FIG. 3 is a fragmentary plan view of a portion of the gasket shown in FIG. 2 substantially enlarged.

Referring now to FIGS. 2–4 for a detailed description of the rectangular shell gasket 10, this may be molded from natural or synthetic rubber of suitable and known composition, or from known resilient rubber-like plastic compositions. The gasket 10 is molded in generally strip form and includes a flat main section 12 (FIG. 4) having integrally molded along the outer edge an upstanding rib 13 of relatively heavy cross section. At or adjacent the inside edge of the gasket 10 there is integrally formed an upper rib 14 extending above the strip 12 and preferably also a lower rib 15 which extends below the main section 12.

The present invention is particularly concerned with the embossed rib pattern extending along the top side of the gaskets 10 and 11 and indicated generally at 16. This pattern 16 consists of a series or chain of embossed diamond formations 17—17 joined point to point. The pattern 16 extends uninterrupted substantially the entire distance around the rectangular shell gasket 10 with the exception of the corners and where interruptions occur to accommodate fasteners or the like such as indicated at 20. However, suitable formations are provided at the corners and interruptions so that the overall seal is not compromised.

The embossed pattern 16 materially increases the sealing capabilities of the shell gasket 10 and the sealer channel gasket 11 for the particular reasons that will now be explained in connection with FIG. 3. When the cover sections 7 and 8 are tightly drawn down on final sealing of the casket 5 the pressure of the surfaces of the cover sections 7 and 8 that mate with the rim of the shell 6 tend to collapse the diamond configuration or pattern 16. However, this tendency to collapse is resisted by the strong points 21 and 22 where the sides of each diamond 17 intersect and by the even stronger points 23—23 where each diamond 17 is joined to the corresponding point of another adjacent diamond 17. Thus, the places of intersection 21, 22 and 23 in effect provide relatively strong vertical columns which tend to resist being bent over to the side instead of remaining upright and being compressed in a generally vertical direction. The configuration made up of the interconnected embossed diamonds 17 thus is substantially stronger in compression than either two parallel spaced ribs would be or a series of interconnected ovals would be, for example.

It will also be seen that the embossed pattern 16 of interconnected diamonds 17 provides a double seal line to prevent ingress or egress of air or moisture into and out of the sealed casket 5. Because of the strength of the points 21, 22 and 23, no leakage will occur thereat. The four upstanding sides 25—25 that interconnect the pressure points 21, 22 and 23 of each diamond 17 are not as strong in compression as the pressure points and will provide less sealing strength than at the points and the immediately adjacent portions of the sides 25. However, the mid-portions of the sides 25 are relatively short with wide bases and therefore quite resistant to bending over. Furthermore, even if one of the sides 25 of a diamond configuration 17 should tilt and allow some leakage, the dead air space within the confines of each embossed diamond 17 will prevent or substantially eliminate transmission or leakage of air or moisture completely across that diamond configuration. Preferably at points 23—23 the sides 25—25 intersect at acute angles of approximately 60°.

Figure 5:
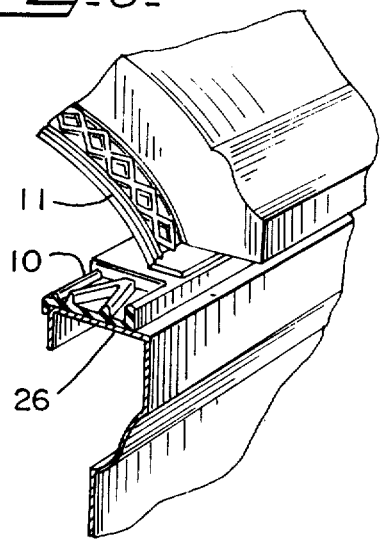
FIG. 5 is an enlarged fragmentary perspective view taken on line 5—5 of FIG. 1 showing a sealer channel gasket made in accordance with the present invention in the seal area between the cover or lid portions of the gasket and also a portion of the rectangular gasket mounted on the rim of the shell portion of the casket of FIG. 1.

As shown in FIG. 5 the rectangular shell gaslet 10 rests on the top of the rim 26 of the shell 6 of the casket 5 and may be secured in place in known manner. The sealer channel gasket 11 takes the form of a single elongated strip which is suitably secured to the sealer channel extending from the foot cap or lid section 7 in known manner. The diamond formation on the sealer channel gasket 11 functions in the same manner as on the shell gasket 10.

I claim:

1. A gasket for a burial casket comprising, a flexible resilient solid rubber-like body in strip form having upper and lower sealing surfaces and inner and outer edges, a downwardly projecting rib on the lower sealing surface at the inner edge of the body, an upwardly projecting rib on the upper sealing surface at the outer edge of the body, a diamond shaped rib pattern on the upper sealing surface generally centrally positioned between the inner and outer edges of the body and in the form of a single chain of diamonds joined point to point, and said upwardly projecting rib extending above the diamond shaped rib pattern.

2. A gasket as defined in claim 1, which further includes a second upwardly projecting rib on the upper sealing surface adjacent the inner edge of the body and offset from the downwardly projecting rib toward the outer edge of the body.

3. A gasket as defined in claim 2, wherein said second upwardly projecting rib is about the same height as the diamond shaped rib pattern.

4. A gasket as defined in claim 1, wherein the sides of the diamonds where joined point to point intersect at acute angles.

* * * * *